US012582998B2

(12) United States Patent
Burcham

(10) Patent No.: US 12,582,998 B2
(45) Date of Patent: Mar. 24, 2026

(54) SERVICEABLE SPRINKLER WITH NUTATING DISTRIBUTION PLATE

(71) Applicant: Hunter Agriculture Incorporated, San Marcos, CA (US)

(72) Inventor: Gregory S. Burcham, Falkville, AL (US)

(73) Assignee: Hunter Agriculture Incorporated, San Marcos, CA (US)

( * ) Notice: Subject to any disclaimer, the term of this patent is extended or adjusted under 35 U.S.C. 154(b) by 377 days.

(21) Appl. No.: 18/154,736

(22) Filed: Jan. 13, 2023

(65) Prior Publication Data

US 2024/0238815 A1 Jul. 18, 2024

(51) Int. Cl.
*B05B 3/00* (2006.01)
*B05B 1/26* (2006.01)

(52) U.S. Cl.
CPC ................ *B05B 3/008* (2013.01); *B05B 1/26* (2013.01)

(58) Field of Classification Search
CPC ......... B05B 3/008; B05B 1/26; B05B 3/0486; B05B 15/18; B05B 3/005; B05B 7/12; B05B 3/0445; B05B 3/04
See application file for complete search history.

(56) References Cited

U.S. PATENT DOCUMENTS

| | | | |
|---|---|---|---|
| 2,848,276 | A | 8/1958 | Clearman |
| 3,009,648 | A | 11/1961 | Hait |
| 3,034,728 | A | 5/1962 | Hruby, Jr. |
| 3,091,400 | A | 5/1963 | Aubert |
| 3,312,400 | A | 4/1967 | Clearman |
| 3,532,273 | A | 10/1970 | Siddall et al. |
| 3,682,388 | A | 8/1972 | Ferguson |
| 3,799,453 | A | 3/1974 | Hart |
| 4,356,972 | A | 11/1982 | Vikre |
| 4,398,666 | A | 8/1983 | Hunter |
| 4,487,368 | A | 12/1984 | Clearman |
| 4,773,594 | A | 9/1988 | Clearman |
| 4,795,100 | A | 1/1989 | Purtell et al. |
| 4,796,811 | A | 1/1989 | Davisson |
| 4,949,905 | A | 8/1990 | Jones et al. |
| RE33,823 | E | 2/1992 | Nelson et al. |
| 5,234,169 | A | 8/1993 | McKenzie |
| 5,372,307 | A | 12/1994 | Sesser |
| 5,381,960 | A | 1/1995 | Sullivan et al. |
| 5,439,174 | A | 8/1995 | Sweet |
| 5,588,595 | A | 12/1996 | Sweet et al. |
| 5,671,885 | A | 9/1997 | Davisson |
| 5,671,886 | A | 9/1997 | Sesser |

(Continued)

FOREIGN PATENT DOCUMENTS

| | | | |
|---|---|---|---|
| EP | 3597302 | A1 | 1/2020 |

OTHER PUBLICATIONS

International Search Report and Written Opinion in International Application No. PCT/US2024/011261. mailed on Apr. 30, 2024, in 18 pages.

*Primary Examiner* — Steven M Cernoch
(74) *Attorney, Agent, or Firm* — KNOBBE, MARTENS, OLSON & BEAR, LLP

(57) ABSTRACT

A sprinkler assembly with a nutating distribution plate can improve even distribution of water. The distribution plate can tilt and/or translate upon water impinging the distribution plate to disperse water in different directions. The sprinkler assembly can have a deflector assembly including the distribution plate and a spindle supported by a starter cap.

14 Claims, 11 Drawing Sheets

(56) References Cited

U.S. PATENT DOCUMENTS

| | | | |
|---|---|---|---|
| 5,699,962 | A | 12/1997 | Scott |
| 5,762,269 | A | 6/1998 | Sweet |
| 5,950,927 | A | 9/1999 | Elliot et al. |
| 5,971,297 | A | 10/1999 | Sesser |
| 6,176,440 | B1 | 1/2001 | Elliot |
| 6,186,414 | B1 | 2/2001 | Clearman et al. |
| 6,199,771 | B1 | 3/2001 | Clearman |
| 6,341,711 | B1 | 1/2002 | Blake |
| 6,382,525 | B1 | 5/2002 | Santiesteban et al. |
| 6,439,477 | B1 | 8/2002 | Sweet et al. |
| 6,530,532 | B1 | 3/2003 | Santiesteban et al. |
| 6,676,038 | B2 | 1/2004 | Gressett |
| 6,871,795 | B2 | 3/2005 | Anuskiewicz |
| 6,899,287 | B2 | 5/2005 | Pinch et al. |
| 6,932,279 | B2 | 8/2005 | Burcham |
| 7,037,960 | B2 | 5/2006 | Ukai |
| 7,070,122 | B2 | 7/2006 | Burcham |
| 7,100,842 | B2 | 9/2006 | Meyer et al. |
| 7,287,710 | B1 | 10/2007 | Nelson |
| 7,395,977 | B2 | 7/2008 | Pinch et al. |
| 7,562,833 | B2 | 7/2009 | Perkins |
| 7,770,821 | B2 | 8/2010 | Pinch et al. |
| 7,942,345 | B2 | 5/2011 | Sesser et al. |
| 8,556,196 | B2 | 10/2013 | Lawyer et al. |
| 8,584,969 | B2 | 11/2013 | Drechsel |
| 8,991,724 | B2 | 3/2015 | Sesser |
| 9,387,494 | B2 | 7/2016 | Sesser et al. |
| 10,710,103 | B2 | 7/2020 | Lawyer et al. |
| 11,213,836 | B2 | 1/2022 | Duffin et al. |
| 11,413,633 | B2 | 8/2022 | Lawyer et al. |
| 2006/0249594 | A1 | 11/2006 | Pinch |
| 2009/0078788 | A1 | 3/2009 | Tony |
| 2010/0252654 | A1 | 10/2010 | Sesser et al. |
| 2011/0155827 | A1 | 6/2011 | Dreschel |
| 2011/0198420 | A1 | 8/2011 | Lawyer et al. |
| 2013/0327846 | A1 | 12/2013 | Sesser |
| 2014/0110501 | A1 | 4/2014 | Lawyer et al. |
| 2014/0312143 | A1 | 10/2014 | Duffin et al. |
| 2016/0256877 | A1 | 9/2016 | Holmes |
| 2018/0311684 | A1 | 11/2018 | Lawyer et al. |
| 2019/0054480 | A1 | 2/2019 | Sesser et al. |
| 2019/0336994 | A1 | 11/2019 | Duffin et al. |
| 2020/0047195 | A1 | 2/2020 | Healy |
| 2020/0222922 | A1 | 7/2020 | Duffin et al. |
| 2020/0290060 | A1 | 9/2020 | Lawyer et al. |
| 2021/0220849 | A1 | 7/2021 | Healy |
| 2021/0276026 | A1 | 9/2021 | Duffin et al. |

SERVICEABLE SPRINKLER WITH NUTATING DISTRIBUTION PLATE

FIELD

The present disclosure relates to apparatuses for irrigating turf, agriculture, and/or landscaping.

BACKGROUND

In many parts of the world, rainfall can be insufficient and/or too irregular to keep turf and landscaping green and/or to sufficiently water crops and other agricultural products. Therefore, irrigation systems are often installed to provide adequate irrigation to landscaping and/or agricultural products.

SUMMARY

An aspect is directed to a sprinkler assembly comprises an inlet configured to receive water, a bracket supported by the inlet, a nozzle in fluid communication with the inlet and positioned downstream of the inlet, the nozzle being configured to direct the water out of the nozzle along an axis, a bearing surface positioned downstream of the nozzle and supported by the bracket, a deflector assembly configured to move with respect to the axis in one or both of a rotational and a tilting direction. The deflector assembly comprises a distribution plate positioned downstream of the nozzle and configured to deflect water from the nozzle, and a starter cap. The starter cap is sized and shaped so as to allow both the bearing surface and the distribution plate to independently articulate with respect to the starter cap at least during a startup of the sprinkler assembly.

A variation of the aspect above is, wherein the starter cap comprises a bullet-like shape.

A variation of the aspect above is, wherein the starter cap comprises a cup-like shape.

A variation of the aspect above is, wherein the starter cap comprises a thimble-like shape.

A variation of the aspect above is, wherein the starter cap comprises an inner bearing surface, the inner bearing surface contacting the bearing surface at least during the startup.

A variation of the aspect above is, wherein the starter cap comprises an outer bearing surface, and wherein the deflector assembly comprises a lower bearing surface, the outer bearing surface contacting the lower bearing surface at least during the startup.

A variation of the aspect above is, wherein the deflector assembly further comprises a spindle extending from a side of the distribution plate facing away from the nozzle and a bearing insert supported by the spindle, the bearing insert comprising the lower bearing surface.

A variation of the aspect above further comprises a retainer configured to capture the starter cap in an interior of the bearing insert.

A variation of the aspect above is, wherein the interior of the bearing insert comprises a groove sized and shaped to capture the retainer.

A variation of the aspect above further comprises a weight supported by the spindle.

A variation of the aspect above is, wherein a receptacle in the spindle comprises the bearing insert.

A variation of the aspect above is, wherein the bearing surface is a surface of a shaft at least partially disposed in the receptacle.

An aspect is directed to a sprinkler assembly comprises an inlet, a bracket connected to the inlet, a nozzle in fluid communication with the inlet and positioned downstream of the inlet, the nozzle configured to direct water out of the nozzle along a nozzle axis, and a deflector assembly downstream of the nozzle and configured to move with respect to the nozzle axis in one or both of a rotational and a tilting direction about a pivot point. The deflector assembly comprises a distribution plate configured to deflect water from the nozzle, a spindle extending from a side of the distribution plate facing away from the nozzle and terminating at a distal end, the distal end comprising a receptacle, a bearing insert disposed in the receptacle, a starter cap disposed in the bearing insert, and a bearing surface supported by the bracket and contacting the starter cap at least during a startup of the sprinkler assembly.

A variation of the aspect above is, wherein the starter cap comprises an inner bearing surface, the inner bearing surface contacting the bearing surface at least during the startup.

A variation of the aspect above is, wherein the starter cap comprises an outer bearing surface, and wherein the bearing insert comprises a lower bearing surface, the outer bearing surface contacting the lower bearing surface at least during the startup.

A variation of the aspect above is, wherein the inner bearing surface has a first radius and the outer bearing surface has a second radius greater than the first radius.

An aspect is directed to a method of starting up a sprinkler assembly from rest for irrigation. The method comprises receiving water at a predetermined pressure at an inlet of the sprinkler assembly, directing water from the inlet through a nozzle positioned downstream of and in fluid communication with the inlet, the water exiting the nozzle along a nozzle axis and impinging a distribution plate of a deflector assembly of the sprinkler assembly, the distribution plate positioned downstream of the nozzle and comprising a starter cap, the deflector assembly being supported by a bearing surface, and independently articulating both the bearing surface and the distribution plate with respect to the starter cap when the sprinkler assembly is starting up.

A variation of the aspect above is, wherein the starter cap comprises an inner bearing surface, the inner bearing surface contacting the bearing surface at least when the sprinkler assembly is starting up.

A variation of the aspect above is, wherein the starter cap comprises an outer bearing surface, and wherein the deflector assembly comprises a lower bearing surface, the outer bearing surface contacting the lower bearing surface at least when the sprinkler assembly is starting up.

A variation of the aspect above is, wherein the starter cap comprises a cup-like shape.

BRIEF DESCRIPTION OF THE DRAWINGS

Various embodiments are depicted in the accompanying drawings for illustrative purposes and should in no way be interpreted as limiting the scope of the embodiments. In addition, various features of different disclosed embodiments can be combined to form additional embodiments, which are part of this disclosure.

FIG. 10 further shows a starter cap of the deflector assembly.

DETAILED DESCRIPTION

Figure 1:
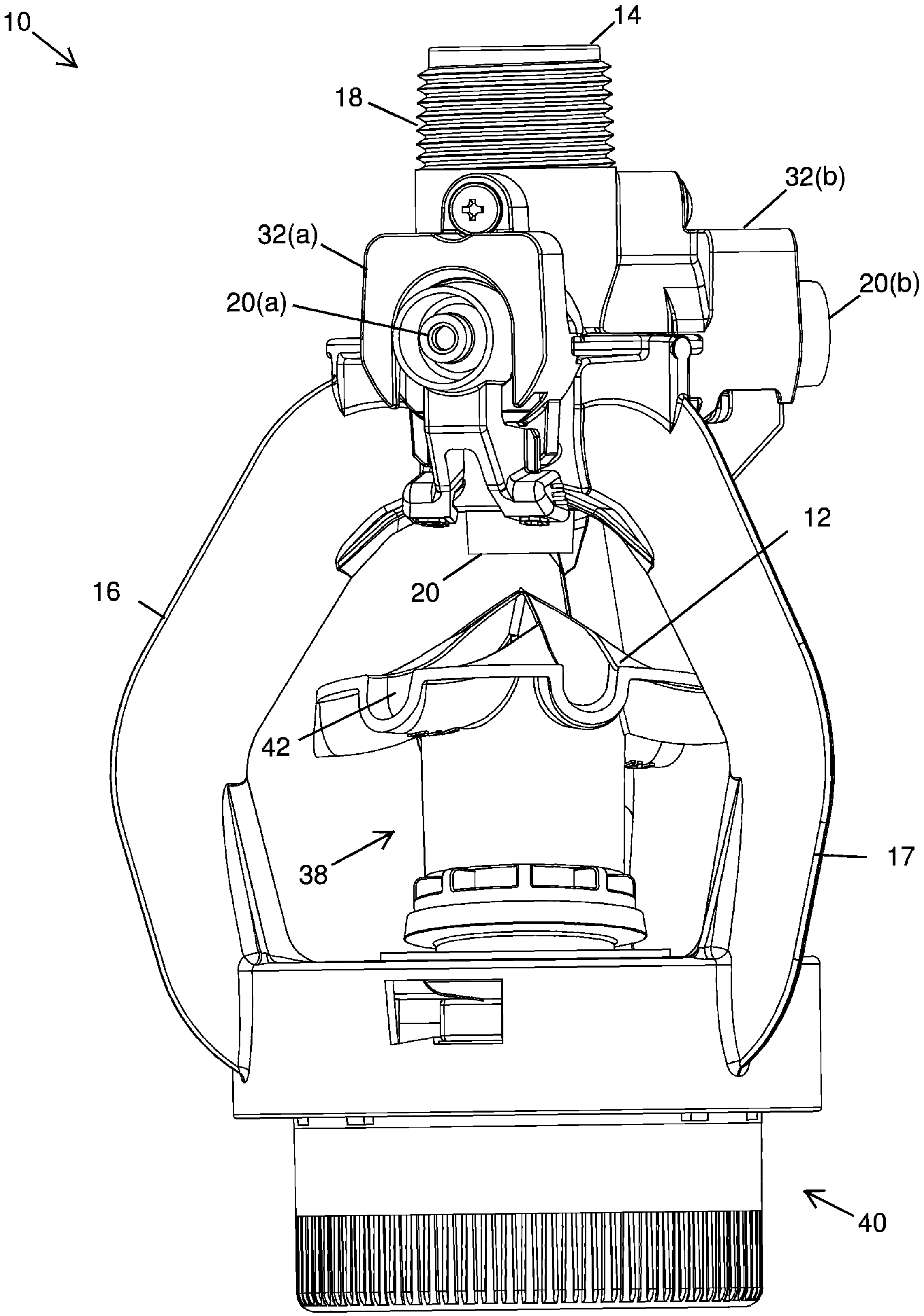
FIG. 1 is a front plan view of an embodiment of a sprinkler with a distribution plate which nutates in a counterclockwise direction during operation of the sprinkler.

FIG. 1 is a front plan view of an embodiment of a sprinkler 10 with a distribution plate 12 configured to nutate in a counterclockwise direction during operation of the sprinkler 10. The sprinkler 10 provides an improved startup by reducing friction forces acting on the distribution plate 12. For example, in certain embodiments, the distribution plate 12 of the sprinkler 10 exhibits improved rotation, tilting, and nutation during startup.

Figure 6:
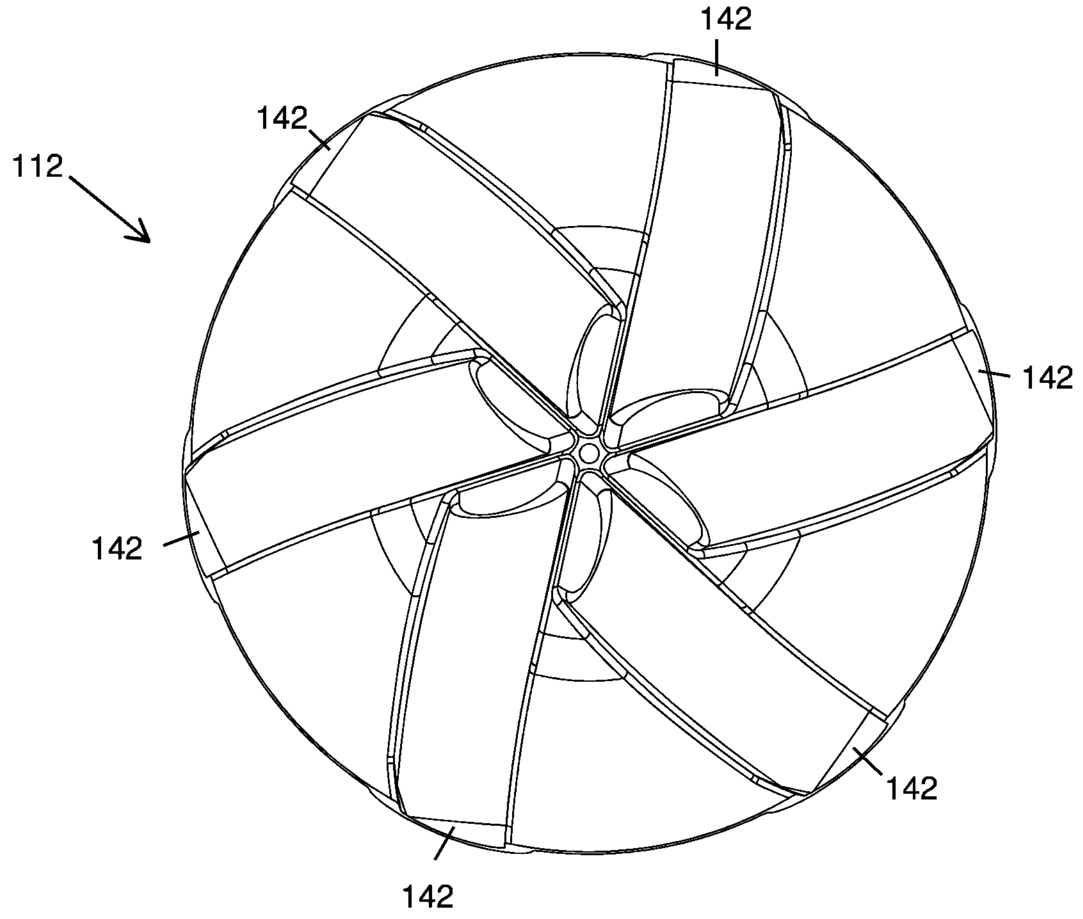
FIG. 6 is a top view of another embodiment of the distribution plate which nutates in a clockwise direction during operation of the sprinkler. In contrast to the one or more grooves illustrated in FIG. 1, the one or more grooves illustrated in FIG. 6 are radially angled to cause the distribution plate to rotate in the clockwise direction when the water from the nozzle impinges on the distribution plate.
Figure 7:
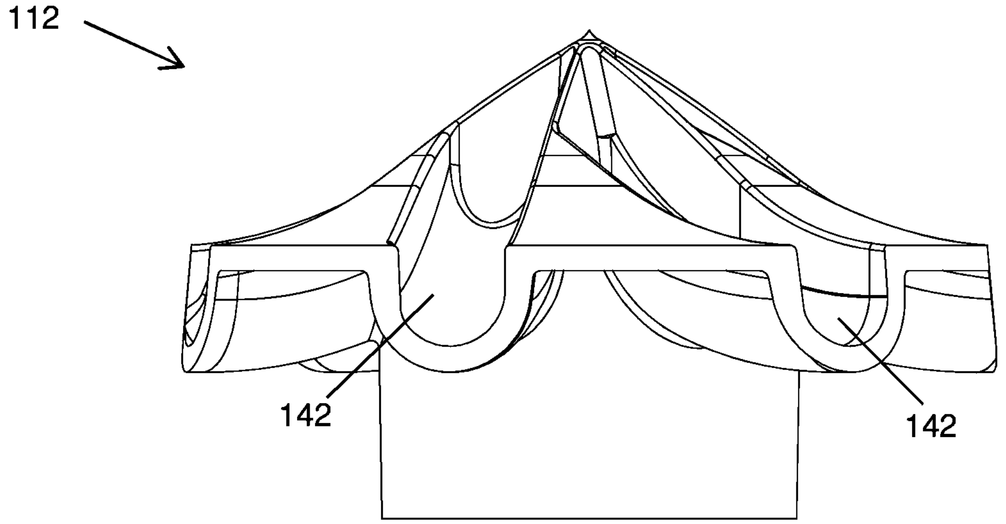
FIG. 7 is a front view of the distribution plate of FIG. 6.

An alternate distribution plate 112 that is configured to nutate in a clockwise direction is illustrated in FIGS. 6 and 7. Thus, depending on which distribution plate 12, 112 is incorporated into the sprinkler 10, a radial angle of one or more grooves 42, 142 in the distribution plate 12, 112 causes the distribution plate 12, 112 to rotate in the clockwise direction or the counterclockwise direction. As explained below, the distribution plate 12, 112 is coupled to the sprinkler 10 so as exhibit a desired nodding or swaying motion about an axis of rotation during operation of the sprinkler 10.

The sprinkler 10 can include an inlet 14. The inlet 14 defines an upstream end of the sprinkler 10. The inlet 14 can be configured to connect to a water source (e.g., an arm of an irrigation system, a water line, a hose, or some other source of water). In certain embodiments, the inlet 14 supports a frame or bracket 16. In some embodiments, the inlet 14 can be formed as a part of the bracket 16. In some embodiments, the inlet 14 can be a separate piece that is removably or permanently attached to the bracket 16.

In some embodiments, the inlet 14 is configured to be secured to a water supply line on an irrigation system. In some embodiments, the inlet 14 is at least partially surrounded by threads 18. The threads 18 can be screwed into the water supply line on the irrigation system. In some instances, a pressure regulator can be positioned between the water supply line and the sprinkler 10. The inlet 14 can also be screwed into an outlet of the pressure regulator. Other attachment methods, including, but not limited to, glued connections, bayonet mounts, snap rings, keys, or collars can be used to secure the sprinkler 10 to either a water supply line or a pressure regulator.

Figure 2:
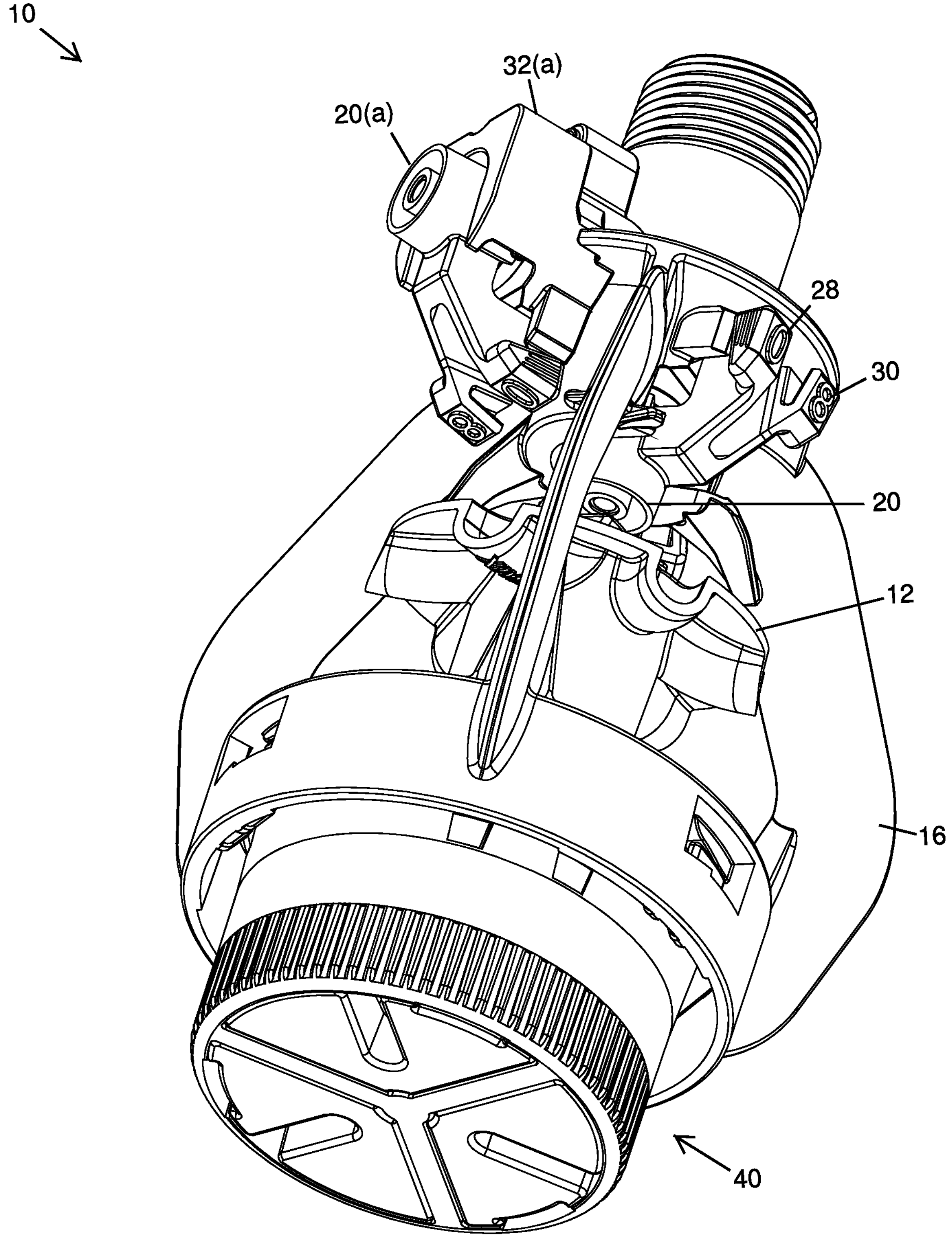
FIG. 2 is a bottom perspective view of the sprinkler of FIG. 1 showing the distribution plate located downstream of a nozzle coupled to an inlet.

FIG. 2 is a bottom perspective view of the sprinkler 10 of FIG. 1. The sprinkler 10 can include a nozzle 20. The nozzle 20 can be in fluid communication with the inlet 14. The nozzle 20 can extend at least partially beyond a downstream end of the inlet 14. The nozzle 20 can be configured to output water that enters the nozzle 20 from the inlet 14. In some embodiments, the nozzle 20 can output water in a pressurized manner. For example, the nozzle 20 can direct pressurized water received from the inlet 14.

In some embodiments, the nozzle 20 can output water in a predetermined direction. For example, the nozzle 20 can output water along a longitudinal axis 46 of the nozzle 20 (see FIG. 10). In some embodiments, the nozzle 20 can direct water towards a predetermined location within the sprinkler 10. In some embodiments, the nozzle 20 can direct water in a direction towards a component of the sprinkler 10. In certain embodiments, the position of the component may be fixed, user adjustable, or movable with respect to the nozzle 20. For example, the nozzle 20 can direct water in a direction towards the distribution plate 12.

As mentioned above, in certain embodiments, the inlet 14 supports the bracket 16. For example, in some embodiments, the bracket 16 is directly coupled to the inlet 14. In some embodiment, the bracket 16 is indirectly coupled to the inlet 14 via another component of the sprinkler 10. For example, in some embodiments, the bracket 16 is coupled to a spacer component or one or more nozzle carriers 32(*a*), 32(*b*).

In the illustrated embodiments, the bracket 16 is manufactured as an integral component with the inlet 14. In alternate embodiments, the bracket 16 is manufactured as a separate component from the inlet 14 and subsequently coupled to the inlet 14 during assembly.

The bracket 16 is configured to generally support the distribution plate 12 relative to the inlet 14 and/or the nozzle 20 while allowing the distribution plate 12 to nutate during operation of the sprinkler 10. In the illustrated embodiment, the bracket 16 is sized and shaped to allow the distribution plate 12 to nutate during operation of the sprinkler 10 while preventing the distribution plate 12 from separating from the sprinkler 10. In this way, the bracket 16 prevents the distribution plate 12 from breaking free from the inlet 14 due to the force created by the pressurized water exiting the nozzle 20 impinging on the distribution plate 12.

The bracket 16 can directly or indirectly couple to the distribution plate 12. In the illustrated embodiment, the bracket 16 couples the inlet 14 to the distribution plate 12 via a housing 40. In other embodiments, the bracket 16 directly couples to the distribution plate 12 while allowing the distribution plate 12 to nutate during operation of the sprinkler 10. For example, the bracket 16 can couple to the distribution plate 12 via a joint such as a ball joint or ball-and-socket joint.

The bracket 16 can include one or more arms 17 (for example, one, two, three, four, or more). In embodiments which include a plurality of arms 17, the arms 17 can be spaced apart from one another. As most clearly illustrated in FIG. 4, the illustrated bracket 16 has three arms 17. In some embodiments, one or more of the arms 17 can have an outwardly bulging middle section. The outwardly bulging middle section can be sized and shaped to accommodate movement of the distribution plate 12. The one or more arms 17 can be joined at one or both of their upstream and downstream ends with a collar. In some embodiments, the upstream end of the bracket 16 is closer to the inlet 14 than the downstream end.

Figure 3:
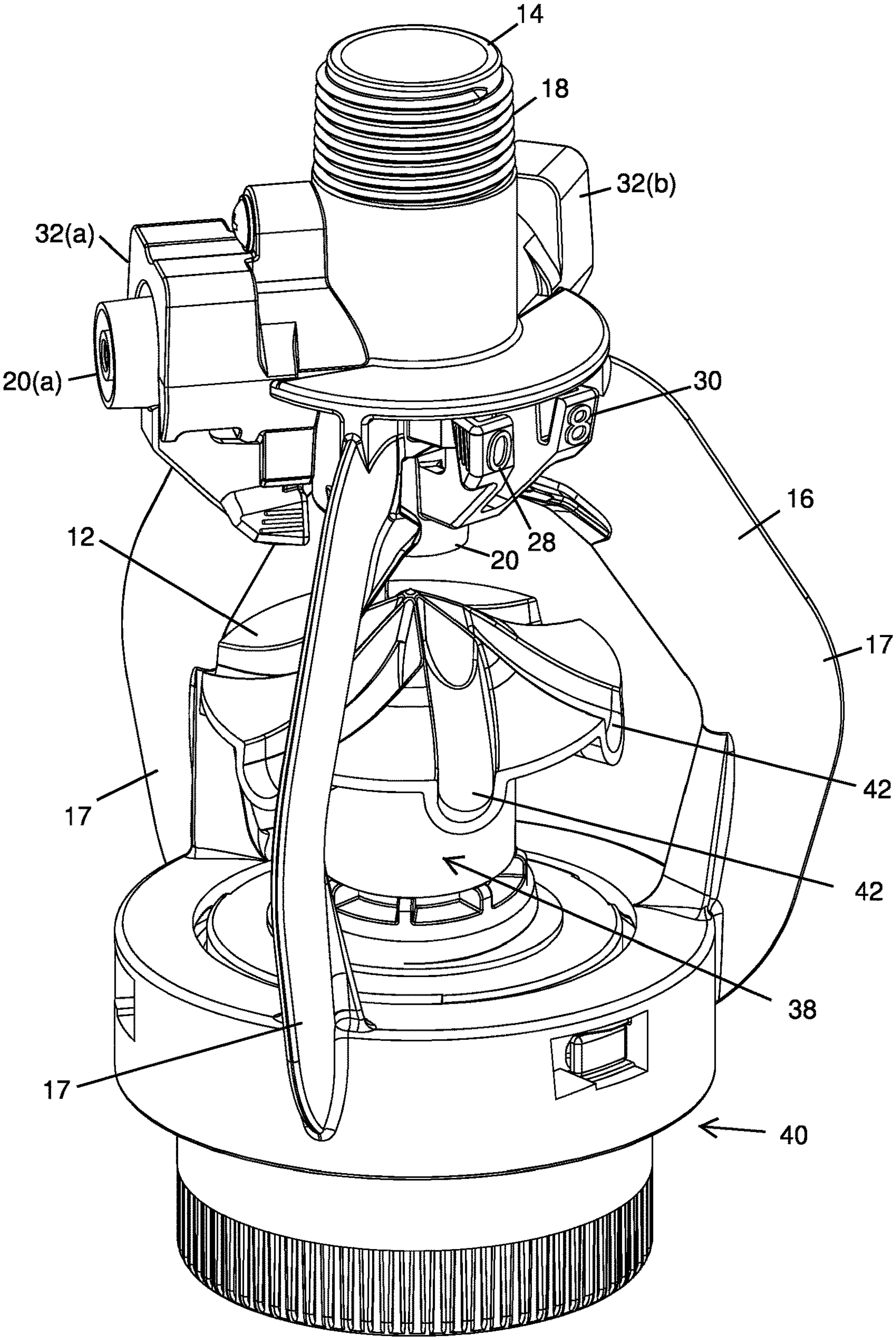
FIG. 3 is a top perspective view of the sprinkler of FIG. 1 showing one or more grooves on an upstream side of the distribution plate.

FIG. 3 is a top perspective view of the sprinkler 10 of FIG. 1 showing one or more grooves 42 on an upstream side of the distribution plate 12. The distribution plate 12 can be positioned downstream of the nozzle 20. In some embodiments, the nozzle 20 is configured to direct water onto the distribution plate 12.

Water impingement on the distribution plate 12 can cause the distribution plate 12 to "wobble." For example, the distribution plate 12 can be configured to rotate and/or tilt with respect to the longitudinal axis 46 of the nozzle 20 or some other axis thereof, and/or undergo nutation in reaction to water impingement from the nozzle 20 onto the distribution plate 12. In the illustrated embodiment, the water impingement from the nozzle 20 contacts the one or more grooves 42 on the upstream side of the distribution plate 12 imparting lateral forces on the distribution plate 12. Wobbling of the distribution plate 12 can allow water to be dispersed in different directions. Dispersing water in different directions can facilitate a more even distribution of water about an area of irrigation than a sprinkler without the distribution plate 12 which nutates.

In the illustrated embodiment, the distribution plate 12 forms a component of a deflector assembly 38 which will be further described below. In some embodiments, the deflector assembly 38 is supported by the housing 40 so as to allow the deflector assembly 38, which carries the distribution plate 12, to "wobble" in concert with the distribution plate 12. The deflector assembly 38 can be surrounded by the one or more arms 17 of the bracket 16 and/or the housing 40. As mentioned above, the housing 40, which will be described in greater detail below, can be releasably coupled to the bracket 16.

Figure 4:
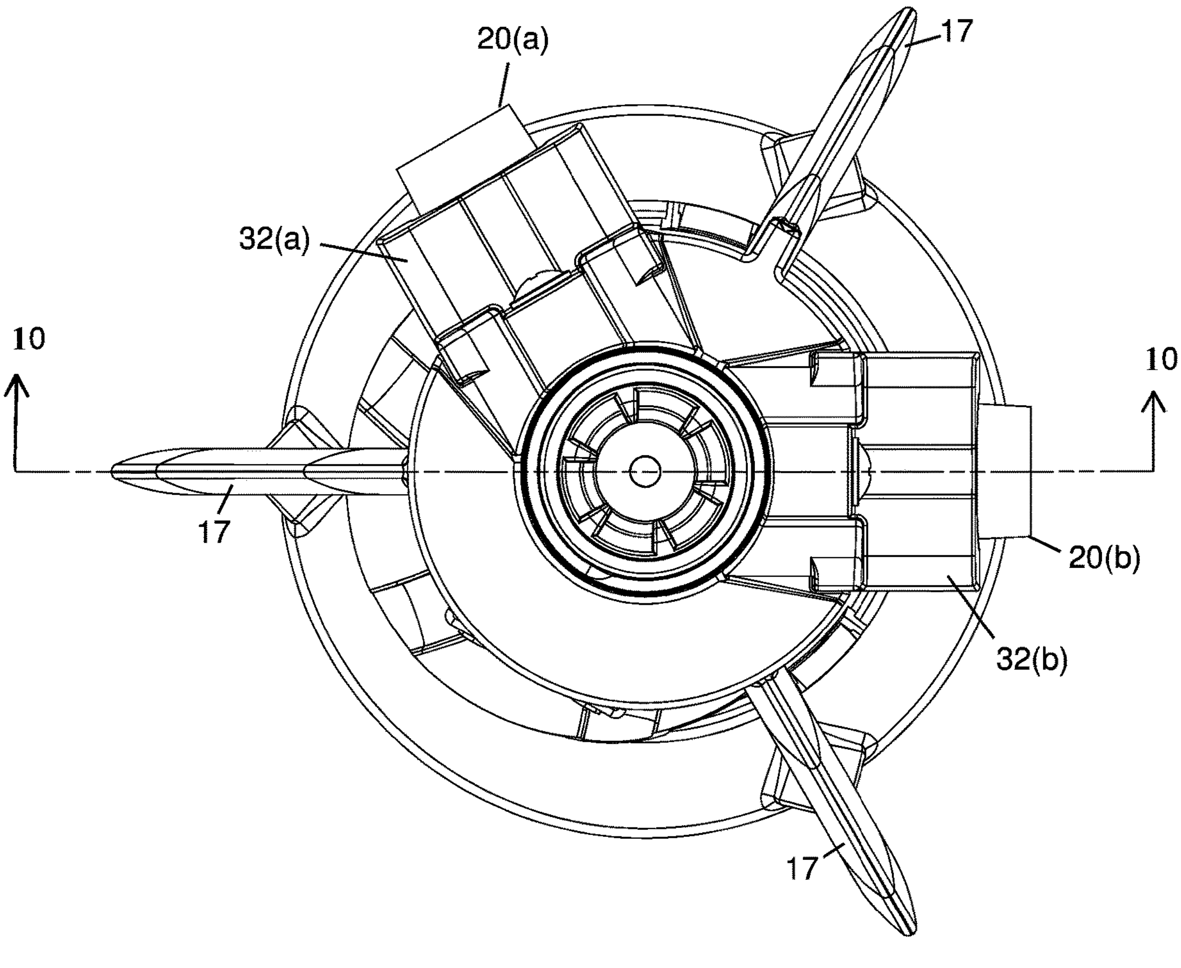
FIG. 4 is a top view of the sprinkler of FIG. 1 showing two spare nozzles releasably coupled to two nozzle carriers on the inlet.

FIG. 4 is a top view of the sprinkler 10 of FIG. 1 showing two spare nozzles 20(*a*), 20(*b*) releasably coupled to two nozzle carriers 32(*a*), 32(*b*). In some embodiments, the sprinkler 10 can include only one carrier 32(*a*) to hold one spare nozzle 20(*a*). In some embodiments, the sprinkler 10 can have more than two carriers 32(*a*), 32(*b*) for holding more than two spare nozzles 20(*a*), 20(*b*).

In the illustrated embodiment, the one or more nozzle carriers 32(*a*), 32(*b*) are coupled to the inlet 14 of the sprinkler 10. In other embodiments, the one or more nozzle carriers 32(*a*), 32(*b*) are coupled to other components of the sprinkler 10 such as, for example, the housing 40 or the bracket 16.

In some embodiments, the one or more carriers 32(*a*), 32(*b*) are manufactured as an integral component with the inlet 14. In other embodiments, each of the one or more carriers 32(*a*), 32(*b*) are separately manufactured and subsequently coupled to the inlet 14. In this way, the one or more carriers 32(*a*), 32(*b*) can be removed and replaced relative to the inlet 14.

Figure 5:
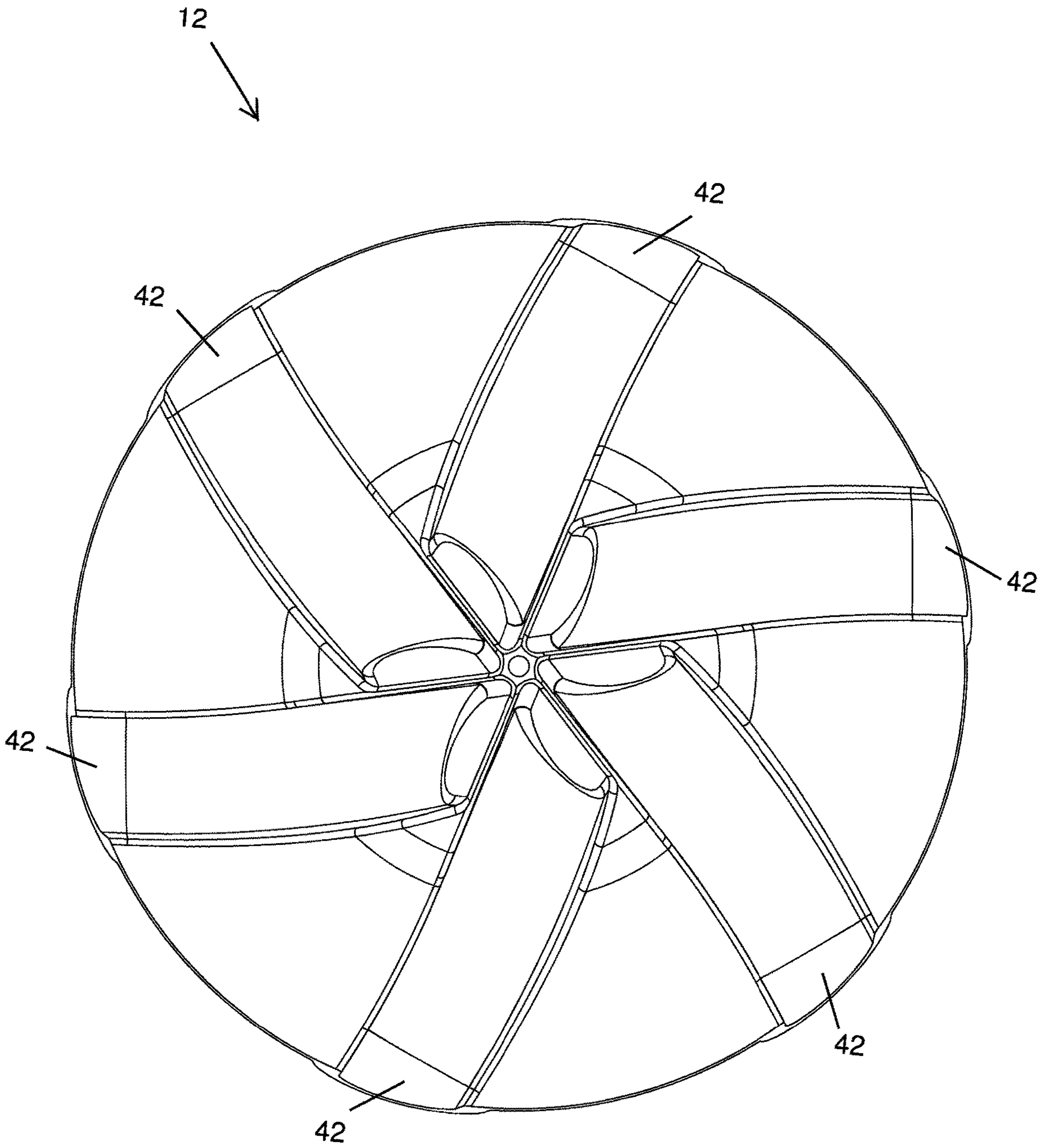
FIG. 5 is a top view of the distribution plate of the sprinkler of FIG. 1 showing the one or more grooves radially angled to cause the distribution plate to rotate in a counter-clockwise direction when the water from the nozzle impinges on the distribution plate.

FIG. 5 is a top view of the distribution plate 12 of the sprinkler 10 of FIG. 1 showing the one or more grooves 42 radially angled to cause the distribution plate 12 to rotate in a counterclockwise direction when the water from the nozzle 20 impinges on the distribution plate 12. In some embodiments, the one or more grooves 42 are disposed on an upstream side of the distribution plate 12. The upstream side of the distribution plate 12 faces the nozzle 20. The one or more grooves 42 can channel the water exiting the nozzle 20 to be ejected in a controlled direction. In some embodiments, the one or more grooves 42 can be radially angled to cause the deflector assembly 38 to rotate when the water from the nozzle 20 impinges the distribution plate 12. In some embodiments, the one or more grooves 42 can be curved. In some embodiments, such as shown in FIG. 5, the one or more grooves 42 can be identical or substantially identical in shape. The one or more grooves 42 can also be uniformly or substantially uniformly distributed on the upstream side of the distribution plate 12.

FIG. 6 is a top view of a distribution plate 112 that is similar to the distribution plate 12 illustrated in FIG. 5 except the radial angle of the one or more grooves 142 in FIG. 6 causes the distribution plate 112 to nutate in the clockwise direction when the water from the nozzle 20 impinges on the distribution plate 112. FIG. 7 is a front view of the distribution plate 112 of FIG. 6.

As explained above, the radial angle of the one or more grooves 42, 142 in the distribution plate 12, 112 causes the distribution plate 12, 112 to rotate in the clockwise direction or the counterclockwise direction when the water from the nozzle 20 impinges on the distribution plate 12, 112. For example, the radial angle of the one or more grooves 142 illustrated in FIGS. 6 and 7 causes the distribution plate 112 to rotate in the clockwise direction when the water from the nozzle 20 impinges on the distribution plate 112.

Although the sprinkler 10 has been disclosed in the context of certain embodiments and examples, it will be understood by those skilled in the art that the sprinkler 10 can comprise any combination of deflector assembly 38 (e.g., distribution plate 12, 112 and spindle 58) and still fall within the scope of this disclosure.

Example Operations of Certain Embodiments of a Sprinkler

Figure 8:
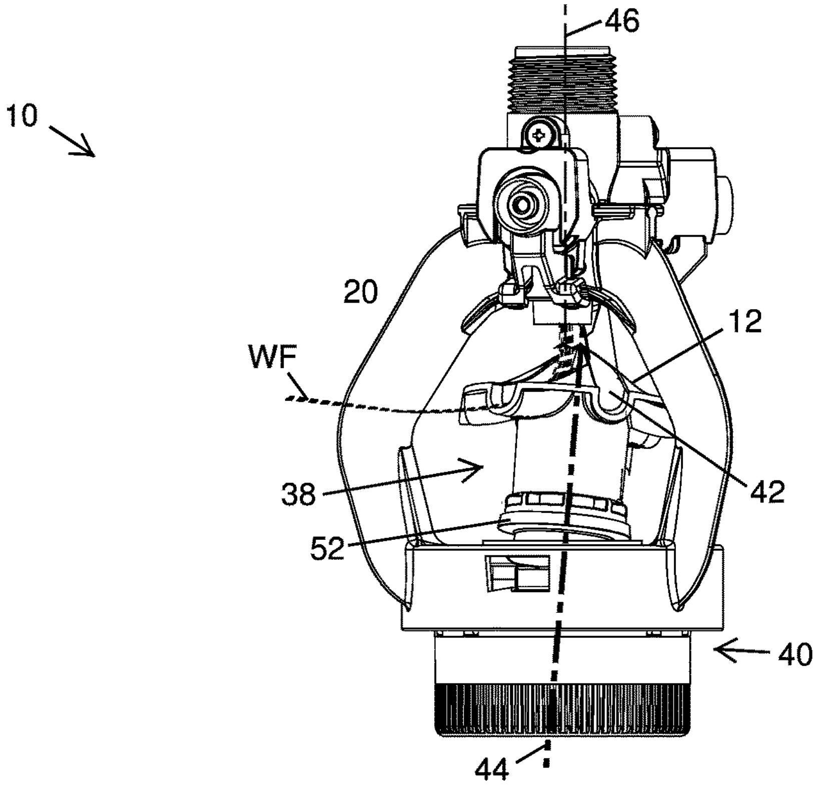
FIG. 8 is a front view of the sprinkler of FIG. 1, as viewed when the distribution plate is in a first tilt position.
Figure 9:
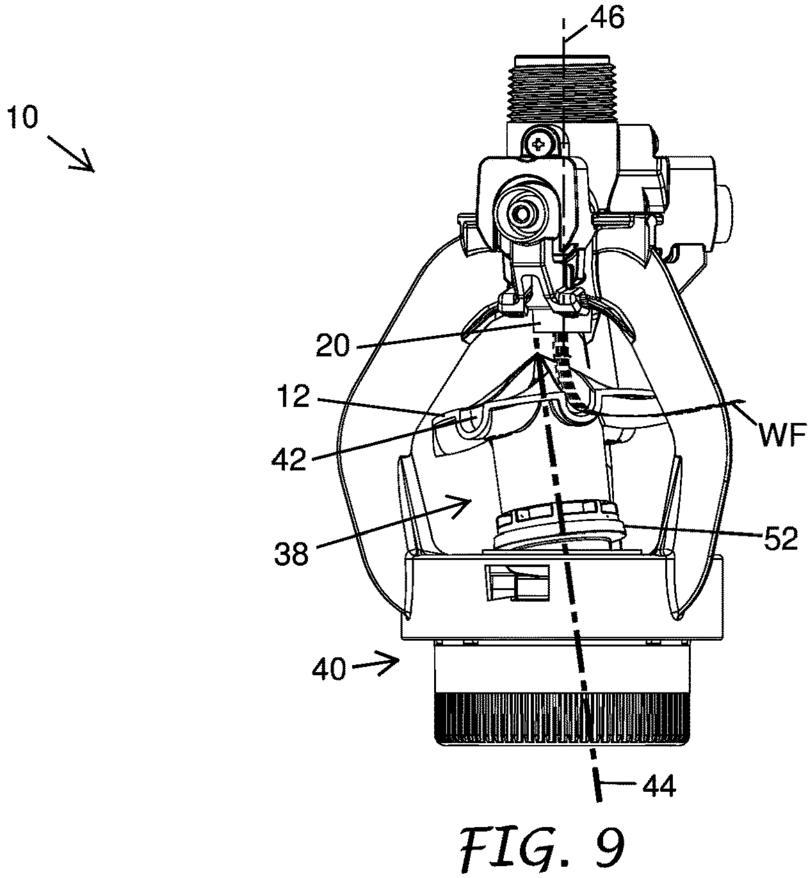
FIG. 9 is a front view of the sprinkler of FIG. 1, as viewed when the distribution plate is in a second tilt position.

FIGS. 8 and 9 illustrate example operations of the sprinkler 10. As illustrated in FIG. 8, when water pressure is applied to the sprinkler 10 during startup, water from the nozzle 20 can impinge on the distribution plate 12 and cause the distribution plate 12 to move angularly to a first side or first tilt position (the right-hand side as shown in FIG. 8). In some embodiments, the distribution plate 12 can be pre-tilted to the first side or first tilt position before startup. The deflector assembly 38 can move until a wear sleeve 52 contacts the housing 40. Additionally, the deflector assembly 38 can begin to rotate as a result of the water exiting the curved grooves 42. As the deflector assembly 38 rotates, water can be dispersed in different directions. FIG. 8 illustrates the direction of water flow WF away from the distribution plate 12 when the distribution plate 12 is at the first side or first tilt position.

As shown in FIG. 9, the deflector assembly 38 can move to a second side or second tilt position (the left-hand side as shown in FIG. 9) relative to the first side illustrated in FIG. 8 as the water impinges on a different area of the distribution plate 12. The direction of water flow WF can change after the deflector assembly 38 has moved to the second side or second tilt position. Continuous rotation of the distribution plate 12 about the central axis 44 combined with the central axis 44 moving back and forth relative to the longitudinal axis 46 of the nozzle 20 can create a nutating movement of the distribution plate 12. The nutating movement of the distribution plate 12 can produce a substantially uniform water flow pattern on the plants being irrigated. The relative positioning of the bearing surface 48, the bearing insert 68, and the distribution plate 12 in relation to the wear sleeve 52 can reduce and/or minimize forces between the wear sleeve 52 and the housing 40 to reduce wear and/or extend the useable life of the wear sleeve 52 as explained in assignee's U.S. Patent Application Publication No. 2021/0220849 A1, titled SERVICEABLE SPRINKLER WITH NUTATING DISTRIBUTION PLATE AND WEAR SLEEVE of Healy, the entirety of which is hereby incorporated herein by reference.

Figure 10:
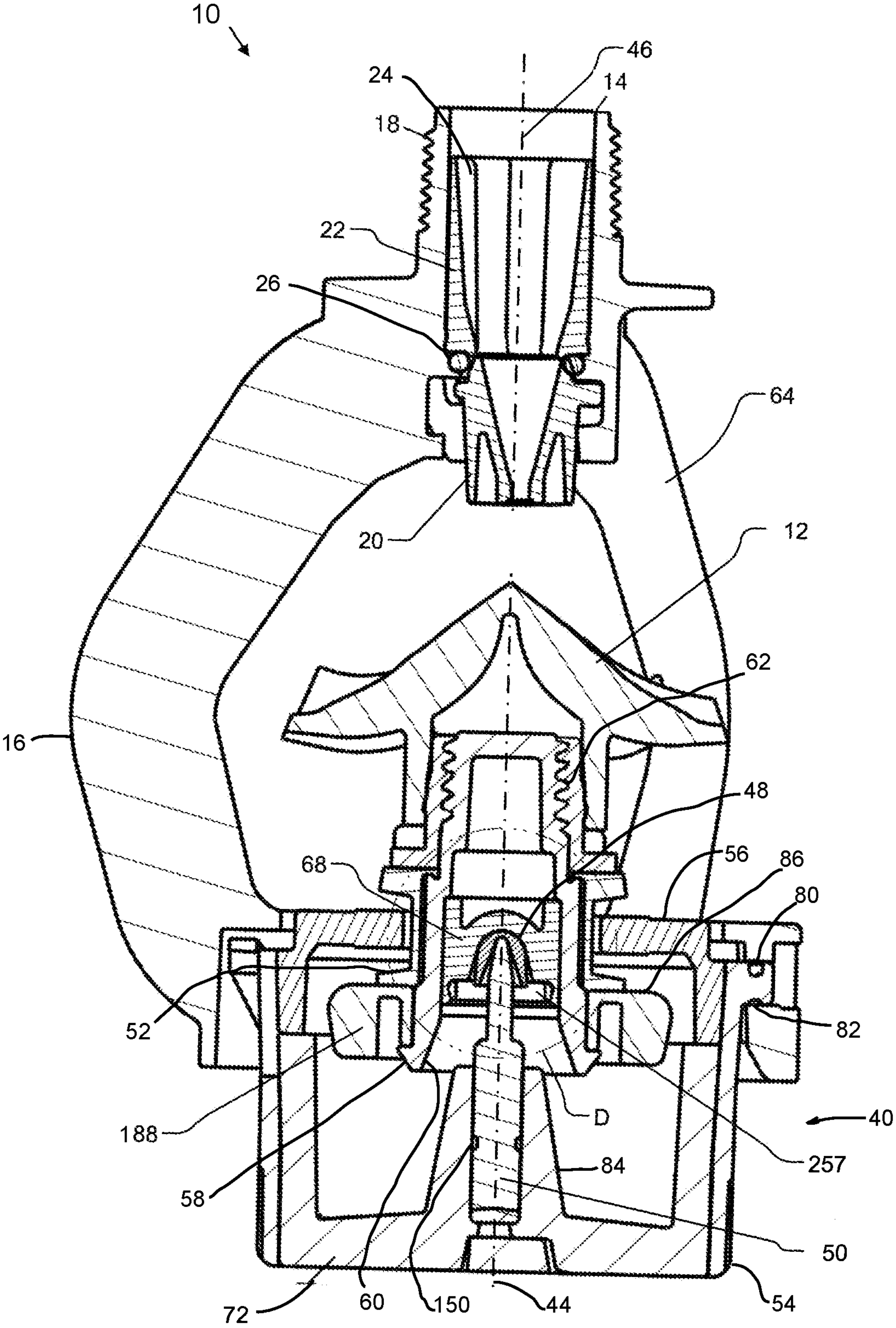
FIG. 10 is a cross-sectional view of the sprinkler of FIG. 1, as viewed along the cut-plane 10-10 of FIG. 4, showing the distribution plate located downstream of the nozzle and temporarily positioned so that a central axis of the distribution plate is on axis with a longitudinal axis of the nozzle.
Figure 11:
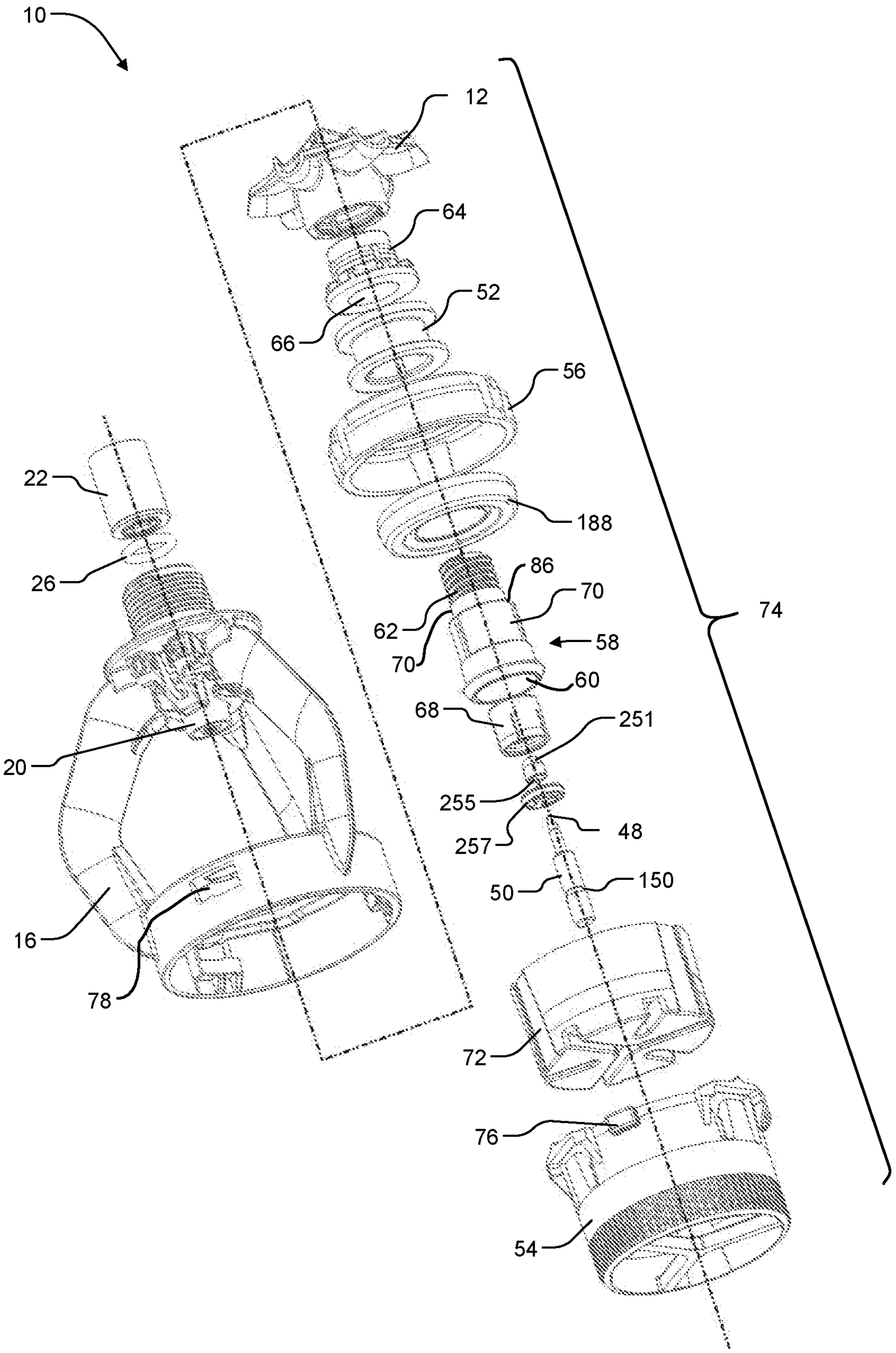
FIG. 11 is a perspective exploded view of the sprinkler from FIG. 10.

FIG. 10 is a cross-sectional view of the sprinkler 10 of FIG. 1, as viewed along the cut-plane 10-10 of FIG. 4, showing the distribution plate 12 located downstream of the nozzle 20 and temporarily positioned so that the central axis 44 of the distribution plate 12 is on axis with the longitudinal axis 46 of the nozzle 20. FIG. 11 is a perspective exploded view of the sprinkler 10 from FIG. 10 and further shows features of a subassembly 74.

In some embodiments, the entire deflector assembly 38, including the distribution plate 12, is located downstream of the nozzle 20. In the illustrated embodiment, the entire deflector assembly 38, including the distribution plate 12, is located downstream of a plane defined by the exit from the nozzle 20. In this way, no portion of the deflector assembly 38 can contact the sprinkler 10 at a location that is upstream of the exit plane and interfere with operation of the sprinkler 10.

In some embodiments, the sprinkler 10 includes a seal retainer 22. In some embodiments, the seal retainer 22 is disposed in the inlet 14. In some embodiments, the seal retainer 22 can be connected to the bracket 16. In some embodiments, the seal retainer 22 can be removably connected to the bracket 16. In some embodiments, the nozzle 20 can be coupled to the bracket 16 and positioned downstream from the seal retainer 22. The seal retainer 22 has an internal flow path. In some embodiments, at least a portion of the internal flow path can be straight, substantially straight, and/or tapered inward between an upstream end of the seal retainer 22 and a downstream end of the seal retainer 22.

In some embodiments, the seal retainer 22 can have one or more vanes 24 formed in the internal flow path. In certain embodiments, the one or more vanes 24 are sized and shaped to straighten water passing through the seal retainer 22 and flowing towards the nozzle 20. The vanes 24 can reduce turbulence in the water as the water moves from the inlet 14 to the nozzle 20.

In some embodiments, the sprinkler 10 includes a seal 26. In some embodiments, the seal 26 is in the form of an O-ring. In some embodiments, the seal 26 can be positioned downstream of the seal retainer 22 to prevent pressurized water from leaking between the seal retainer 22 and the nozzle 20. The upstream end of the seal retainer 22 can be positioned flush or downstream of the inlet 14 and/or the bracket 16.

The nozzle 20 can be removed and reinstalled to position the nozzle 20 on the bracket 16 without any tools. As illustrated most clearly in FIG. 3, a user can pinch tabs 28 and 30 on the nozzle 20 and then move the nozzle 20 slightly downwards to disengage the nozzle 20 from the bracket 16 and then laterally to remove the nozzle 20 from the sprinkler 10. The nozzle 20 similarly can be replaced by reversing the procedure. In some embodiments, the nozzle 20 can be similar to, or the same as the nozzle disclosed in assignee's U.S. Pat. No. 8,556,196, titled QUICK CHANGE NOZZLE of Lawyer et. al., issued on Oct. 15, 2013, the entirety of which is hereby incorporated herein by reference. The nozzle 20 can also include an internal taper to accelerate and/or pressurize water flow out from the nozzle 20.

The bracket 16 can support a bearing surface 48 relative to the inlet 14. In the illustrated embodiment, the bearing surface 48 is disposed on the opposite side of the distribution plate 12 from the inlet 14. In some embodiments, the bearing surface 48 can be positioned downstream of the distribution plate 12. In some embodiments, the bearing surface 48 can act as a pivot point for the radial and side-to-side motion of the deflector assembly 38.

In some embodiments, the bearing surface 48 is positioned so as to be elevated a distance away from a bottom of the sprinkler 10. In some embodiments, the distance the bearing surface 48 is elevated from the bottom of the sprinkler 10 is selected so that the bearing surface 48 is located within the housing 40. In some embodiments, the distance the bearing surface 48 is elevated from the bottom of the sprinkler 10 is selected so that a horizontal plane passes through both a portion of the bearing surface 48 and a portion of an upper portion 56 of the housing 40. In some embodiments, the distance the bearing surface 48 is elevated from the bottom of the sprinkler 10 is selected so that a horizontal plane passes through both a portion of the bearing surface 48 and a portion of a wear sleeve 52. The bearing surface 48 and the top of the shaft 50 can be formed to have a very low resistance to movement to facilitate very easy starting characteristics. During normal operation after startup, the bearing surface 48 may not be subject to high pressures or significant motion. The positioning of the bearing surface 48 relative to the wear sleeve 52 can cause the majority of the wear to be at the wear sleeve 52 during normal operation after startup and very little to no wear at the bearing surface 48. In some embodiments, the top of the shaft 50 can be positioned below the center of the wear sleeve 52 during normal operation so that all, or most of the action of the deflector assembly 38 happens above the top of the shaft 50 to prevent or reduce load and wear on the bearing surface 48 after startup.

In some embodiments, by elevating the bearing surface 48, the bearing surface 48 can be positioned closer to the distribution plate 12. In some embodiments, by elevating the bearing surface 48, the bearing surface 48 can be positioned near the upper portion 56 of the housing 40. In some embodiments, by elevating the bearing surface 48, a portion of the deflector assembly 38 can be disposed below the bearing surface 48 and in the housing 40. In some embodiments, the portion of the deflector assembly 38 disposed below the bearing surface 48 is more than a quarter of the entire deflector assembly 38. In some embodiments, the portion of the deflector assembly 38 disposed below the bearing surface 48 is selected to facilitate nutation of the deflector assembly 38. In some embodiments, the portion of the deflector assembly 38 disposed below the bearing surface 48 is selected so that a resulting center of mass of the deflector assembly 38 is coplanar, slight below, or slight above the bearing surface 48.

The bearing surface 48 can have a spherical or substantially spherical shape, or otherwise a curved shape. In some embodiments, the bearing surface 48 can be a separate component, such as a ball bearing, installed into the sprinkler 10 or a curved surface of the sprinkler 10. In this way, the bearing surface 48 can support the deflector assembly 38 and provide a bearing surface upon which the deflector assembly 38 can move radially and from side to side. In the illustrated embodiment, the bearing surface 48 is a surface on a distal end of a shaft 50. In the illustrated embodiment, the shaft 50 extends in an upward direction within the housing 40.

In some embodiments, the shaft 50 is supported by the housing 40. In the illustrated embodiment, the shaft 50 is supported by a boss 84 or other mounting feature of a weight 72 disposed within the housing 40. In some embodiments, the boss 84 is configured to receive a portion of the shaft 50 in a press-fit manner. In some embodiments, a surface of the shaft 50 includes a groove or other locking feature configured to engage with a complementary locking feature of the boss 84 so as to secure the shaft 50 to the boss 84. In some embodiments, the shaft 50 is inserted into the boss 84 and then rotated to a locked position. In some embodiments, at least a portion of the shaft 50 is knurled to enhance locking of the shaft 50 to the boss 84.

In some embodiments, the weight 72 is molded around at least a portion of the shaft 50. In some embodiments, the shaft 50 is inserted into the mold that forms the weight 72. When the weight 72 is formed in the mold, at least a portion of the weights 72 surrounds at least a portion of the shaft 50. In some embodiments, the weight 72 and the shaft 50 are formed as a single unit. In some embodiments, the shaft 50 is permanently connected to the weight 72 preventing the shaft 50 from being separated from the weight 72 without making at least either the weight 72 or the shaft 50 unusable. In some embodiments, at least a portion of the shaft 50 can be knurled, or otherwise deformed to increase the strength of a joint between the shaft 50 and the weight 72. In some embodiments, an outer surface of the shaft 50 can include at least one groove 150. In some embodiments, material of the weight 72 can flow into the at least one groove 150 to strengthen the joint between the shaft 50 and the weight 72 and prevent the shaft 50 from separating from the weight 72.

In some embodiments, an outer surface of the boss 84 has a truncated conical shape or other preferred shape. In some embodiments, the outer surface of the boss 84 has a shape complementary to the shape of the receptacle 60 that does not interfere with the radial and side-to-side motion of the deflector assembly 38.

The bracket 16 can further support the wear member or wear sleeve 52. In some embodiments, the wear sleeve 52 can be positioned at or downstream of the distribution plate 12. In some embodiments, at least a portion of the wear sleeve 52 is positioned between the deflector assembly 38 and the housing 40. In some embodiments, the wear sleeve 52 is positioned between an outer surface of the deflector assembly 38 and an inner surface of the housing 40.

In some embodiments, the wear sleeve 52 can surround a portion of the deflector assembly 38. In some embodiments, the wear sleeve 52 forms a full circle around a portion of the deflector assembly 38. In some embodiments, the wear sleeve 52 forms only a portion of a circle. In some embodiments, the wear sleeve 52 has a continuous circumference. In some embodiments, the circumference of the wear sleeve 52 is discontinuous. In some embodiments, the wear sleeve 52 has a gap between ends of the wear sleeve 52. In some embodiments, the wear sleeve 52 is manufactured in two parts which are assembled together on the sprinkler 10. In some embodiments, the wear sleeve 52 is manufactured in three parts which are assembled together on the sprinkler 10.

In some embodiment, a cross-section of the wear sleeve 52 has a linear shape. In some embodiment, the cross-section of the wear sleeve 52 has a curved shape such as an L-shape. In the illustrated embodiment, the cross-section of the wear sleeve 52 is C-shaped. In some embodiment, the cross-section of the wear sleeve 52 is symmetrical. In some embodiment, the cross-section of the wear sleeve 52 is asymmetrical.

In some embodiments, the wear sleeve 52 is positioned to focus intermittent or transitory contact between the deflector assembly 38 and the sprinkler 10 during operation of the sprinkler 10 on a surface of the wear sleeve 52. In some embodiments where the wear sleeve 52 has a curved shape such as an L or C-shape, the contact between the deflector assembly 38 and the sprinkler 10 can occur on multiple surfaces of the wear sleeve 52. The shape and/or position of the wear sleeve 52 with respect to one or more of the bearings surface 48, the distribution plate 12, and the deflector assembly 38 can advantageously reduce wear and extend the usable life of the sprinkler 10.

In the illustrated embodiment, a range of the radial and side-to-side motion of the deflector assembly 38 upon the bearing surface 48 is limited by the wear sleeve 52. In this way, any resulting forces due to the deflector assembly 38 nutating during operation of the sprinkler 10 passes through the wear sleeve 52 and the bearing surface 48. By limiting the range of motion of the deflector assembly 38, the wear sleeve 52 keeps the distribution plate 12 in a working alignment with the longitudinal axis of the nozzle 20. The working alignment can allow water out of the nozzle 20 to be directed to the distribution plate 12.

As mentioned above, in some embodiments, the wear sleeve 52 is positioned between at least a portion of the outer surface of the deflector assembly 38 and at least a portion of the inner surface of the housing 40. For example, the wear sleeve 52 can be positioned on the outer surface of the deflector assembly 38 and/or on the inner surface of the housing 40. In the illustrated embodiment and as will be further explained below with respect to FIG. 11, the wear sleeve 52 is disposed on or carried by the deflector assembly 38. In some embodiments, the wear sleeve 52 is disposed on or carried by the housing 40. As shown in FIG. 10 and in some embodiments, the wear sleeve 52 is the only transitory or intermittent contact portion of the deflector assembly 38 with the remainder of the sprinkler 10 after startup.

With continued reference to FIG. 10, the deflector assembly 38 can be supported by the bearing surface 48. All or substantially all of the weight of the deflector assembly 38 can be positioned on the bearing surface 48 when water is not applied and at startup. The weight on the bearing surface 48 can cause the wear sleeve 52 and the central axis 44 of the distribution plate 12 to be off-axis from the center axis 46, which can be the longitudinal axis 46 of the nozzle 20, when water is not being applied to the sprinkler 10. The pre-tilting of the distribution plate 12 can cause the water from the nozzle 20 to apply more force to one side of the distribution plate 12 than to an opposite side of the distribution plate 12 during startup. The unequal weight distribution on the distribution plate 12 can cause the wear sleeve 52 to move towards an opposite side of the housing 40 and start the nutating (for example, rotating and wobbling) action of the distribution plate 12 when the pressurized water is supplied to the sprinkler 10. In some embodiments, the pre-tilting of the distribution plate 12 can reduce the likelihood of prolonged alignment between the central axis 44 of the distribution plate 12 and the longitudinal axis 46 of the nozzle 20 when water first impinges the distribution plate 12 during startup.

FIG. 11 is a perspective exploded view of the sprinkler 10 of FIG. 1. The sprinkler 10 comprises exemplary features for reducing friction forces, resulting in improved rotation, tilting, and nutation of the distribution plate 12 during startup. In certain embodiments, the subassembly 74 comprises the shaft 50, the starter cap 251, and the bearing insert 68. The shaft 50 can include the bearing surface 48. The starter cap 251 can be disposed between the bearing insert 68 and the shaft 50.

In some embodiments, the sprinkler 10 comprises, for example, one or more weights 188. In certain embodiments, a location of the weight 188 can shift the center of mass closer to the distribution plate 12 along the central axis 44. In certain embodiments, the mass of the weight 188 is distributed radially away from the central axis 44.

In some embodiments, the deflector assembly 38 can include a spindle 58 extending from the distribution plate 12 on the opposite side of the distribution plate 12 than the one or more grooves 42. In some embodiments, the spindle 58 directly couples the distribution plate 12 to the bearing surface 48. In some embodiments, the spindle 58 indirectly couples the distribution plate 12 to the bearing surface 48 via one or more other components (e.g., starter cap 251).

The spindle 58 supports the one or more weights 188. In the illustrated embodiment, the spindle 58 supports one weight 188. In other embodiments, the spindle 58 supports more than one weight 188. Each of the one or more weights 188 can have the same weight or a different weight. In some embodiments, the one or more weights 188 can be constructed of a metal with an appropriate mass. For example, in certain embodiments, the one or more weights 188 are constructed of brass.

In some embodiments, the one or more weights 188 have an annular shape. In some embodiments, the one or more weights 188 are sized to engage with a portion of the spindle 58. For example, in certain embodiments, the one or more weights 188 are pressed onto, or otherwise held securely to the spindle 58. In some embodiments, the number and weight of the one or more weights 188 are selected to adjust or change the rotational speed of the spindle 58. In some embodiments, adding the one or more weights 188 to the spindle 58 reduces the rotational speed of the spindle 58, and subsequently the distribution plate 12 or 112. In this way, water coverage by the sprinkler 10 can be customized.

As is illustrated in the embodiment of FIG. 11, the spindle 58 carries the wear sleeve 52 and the one or more weights 188 about its outer circumference. For example, the wear sleeve 52 and the one or more weights 188 can be installed around a surface 70 formed on the outer circumference of the spindle 58 between an end of the insert 64 and a ridge 86 of the spindle 58. In certain embodiments, the wear sleeve 52 abuts against the insert 64 and the weight 188 so as to maintain a position of the wear sleeve 52 along the outer circumference of the spindle 58 during use of the sprinkler 10. In certain embodiments, the one or more weights 188 abut against the wear sleeve 52 and the ridge 86 so as to maintain a position of the one or more weights 188 along the outer circumference of the spindle 58 during use of the sprinkler 10.

In the illustrated embodiment, the spindle 58 includes an outer thread 62 for engagement with an inner thread 66. In some embodiments, the inner thread 66 is disposed on the distribution plate 12. In the illustrated embodiment, the inner thread 66 is disposed on an insert 64 that is press-fit or otherwise coupled to the distribution plate 12. In some embodiments, the insert 64 can also be removably attached to the distribution plate 12 by using bayonet mounts, snap rings, keys, collars, or other attachment methods (e.g., attachment structures or methods that do not require use of tools or specialized tools for disconnection).

In some embodiments, the bearing surface 48 can be positioned between the spindle 58 and the housing 40 and/or the bracket 16 when assembled. In some embodiments, the bearing surface 48 can be a surface of the housing 40. In some embodiments, the bearing surface 48 can be removably attached to the housing 40.

As illustrated in FIG. 11, the bearing surface 48 can be an upper or distal surface of the shaft 50. The bearing surface 48 can have a spherical or substantially spherical shape, or otherwise a curved surface. The shaft 50 can be supported by the housing 40. In the illustrated embodiment, a proximal end of the shaft 50 is coupled to a receptacle in the weight 72. In some embodiments, the shaft 50 is coupled to the lower or upper portions 54, 56 of the housing 40. In some embodiments, the shaft 50 is coupled to the bracket 16 such as to, for example, the lower collar of the bracket 16. The bearing surface 48 can support the deflector assembly 38 when water is not applied to the sprinkler 10, and/or provide a smooth surface for the deflector assembly 38 to move relative to the housing 40.

In some embodiments, the deflector assembly 38 includes a receptacle 60 configured to receive at least a portion of the shaft 50. In some embodiments, the receptacle 60 can be a cone shape or other preferred concave surface. In some embodiments, the receptacle 60 is sized and shaped larger than the shaft 50 so that only the bearing surface 48 portion of the shaft 50 contacts the deflector assembly 38 over a range of the radial and side-to-side motion of the deflector assembly 38. In some embodiments, the portion of the deflector assembly 38 in the receptacle 60 that contacts the bearing surface 48 has a shape complementary to the shape of the bearing surface 48 that does not interfere with the radial and side-to-side motion of the deflector assembly 38.

Under some conditions, such as when water to the sprinkler 10 has been turned off and the sprinkler 10 is not pressurized, a lower bearing surface 168 of the bearing insert 68 (FIG. 12) rests on the bearing surface 48 on the end of the shaft 50 as shown in FIG. 10. A friction force between the bearing surfaces 48 and 168 which is dependent upon the surface area in contact and the weight of components such as the spindle 58 and weight 188, may resist rotation and/or tilting of the distribution plate 12 and thus inhibit startup of the sprinkler 10. Subsequently, the sprinkler 10 is pressurized, the water impinges upon the distribution plate 12 and applies a force along the longitudinal axis 46 of the nozzle 20. A first portion of the force may push the bearing insert 68 into greater contact with the end of the shaft 50 and/or increase normal forces at the point of contact, thus increasing the friction force between the bearing surfaces 48 and 168. A second portion of the force produces rotational forces or torques about the central axis 44 of the distribution plate 12 due to the flow of water through the grooves 42. In most instances, the torques are sufficient to cause the distribution plate 12 to rotate, tilt, and nutate about the point of contact between the bearing surfaces 48 and 168.

However, in some instances, the second portion of the force may not be sufficient to overcome the friction force between the bearing surfaces 48 and 168, resulting in the distribution plate 12 remaining stationary. For example, if the water has been turned off for a period of time and subsequently is turned on at a low flow rate or low pressure, such as through a low flow nozzle, water flowing through the grooves 42 may not produce enough torque to overcome the friction force. The distribution plate 12 may remain stuck in a rest position.

In some embodiments, the bearing surface 48 portion of the shaft 50 directly contacts the spindle 58. In some embodiments, the bearing surface 48 portion of the shaft 50 supports the spindle 58 via one or more other components. In the illustrated embodiment, the bearing insert 68 and the starter cap are 251 are disposed in the receptacle 60 and between the bearing surface 48 portion of the shaft 50 and the spindle 58. In certain embodiments, the starter cap 251 is disposed between the receptacle 60 and the bearing surface 48 portion.

The bearing insert 68 can allow the deflector assembly 38 to rotatably pivot at the bearing surface 48 as well as slide or translate relative to the curved surface of the bearing surface 48. In the illustrated embodiment when assembled, the bearing surface 48 portion of the shaft 50 loosely couples to the surface of the bearing insert 68 such that the deflector assembly 38 can wobble (e.g., tilt, oscillate, bounce, shake, or otherwise move) and rotate when pressurized water from the nozzle 20 impinges on the distribution plate 12.

In some embodiments, the wear sleeve 52 is carried by a portion of the spindle 58 of the deflector assembly 38. As is illustrated in FIG. 11 and in some embodiments, the spindle 58 carries the wear sleeve 52 about its outer circumference. For example, the wear sleeve 52 can be installed around a surface 70 formed on the outer circumference of the spindle 58 between an end of the insert 64 and a ridge 86 of the spindle 58. In this way, the wear sleeve 52 abuts against the insert 64 and the ridge 86 so as to maintain a position of the wear sleeve 52 along the outer circumference of the spindle 58 during use of the sprinkler 10. The wear sleeve 52 can contact an inner surface of the housing 40 during use of the sprinkler 10, including normal operation of the sprinkler 10.

In some embodiments, contacts between one or more surfaces of the wear sleeve 52 and the inner surface of the housing 40 can restrict the angular movement of the deflector assembly 38 and maintain a correct position of the deflector assembly 38 relative to the nozzle 20 during normal operation. The correct position can allow water out of the nozzle 20 to impinge on the distribution plate 12.

In some embodiments, the wear sleeve 52 can provide a resistive interface between the deflector assembly 38 and the housing 40 to slow or otherwise regulate the speed of rotation of the distribution plate 12 during operation of the sprinkler 10.

In some embodiments, the wear sleeve 52 can be a pliable, elastic, resilient, and/or flexible material that can cushion the impact of the deflector assembly 38 relative to the housing 40 during operation.

Still referring to FIG. 11, in some embodiments, the housing 40 includes a lower portion 54 and the upper portion 56 mentioned above. In some embodiments, the weight 72 is disposed at least partially within the housing 40. In the illustrated embodiment, the weight 72 can be installed at least partially inside of the lower potion 54. The upper portion 56 can be place over the weight 72 to retain the weight 72 between the lower portion 54 and the upper portion 56. In some embodiments, the weight 72 is a dense material. In some embodiments, the weight 72 comprises a metal such as zinc. In some embodiments, the weight 72 is die cast. In some embodiments, the weight 72 comprises a plurality of small weights such as shot. In some embodiments, the weight 72 comprises a liquid. In some embodiments, the weight 62 is positioned at or near the downstream end of the sprinkler 10 to reduce vibration of the sprinkler 10 during normal operation.

In some embodiments, the housing 40 is removable from the sprinkler 10. In some embodiments, the lower portion 54 can be removably attached to the bracket 16. In some embodiments, the upper portion 56 is only removable when the lower portion 54 is not installed to the bracket 16.

In some embodiments, the deflector assembly 38 and the housing 40 together form the subassembly 74 which together couples to the bracket 16 via the lower portion 54 of the housing 40. In this way, the subassembly 74 including the deflector assembly 38 and the housing 40 is removed from the sprinkler 10 by the user simply decoupling the lower portion 54 from the bracket 16.

In some embodiments, the lower portion 54 can include one or more attaching tabs 76. The bracket 16 can have openings 78 configured to receive the attaching tabs 76. The openings 78 can be located on the collar connecting downstream ends of the plurality of arms 17 of the bracket 16.

In some embodiments there can be three attaching tabs 76 and three openings 78. In some embodiments there can be fewer than three attaching tabs 76 and openings 78. In some embodiments there can be more than three attaching tabs 76 and openings 78. The attaching tabs 76 and/or the openings 78 can be substantially uniformly spaced or otherwise around the lower portion 54 and/or the bracket 16. Each of the attaching tabs 76 can engage one of the openings 78 to removably couple the lower portion 54 to the bracket 16. The lower portion 54 can be at least partially disposed within a cavity of the bracket 16 (such as within a cavity of the collar) when coupled to the bracket 16.

In some embodiments, a wear bumper 80 can surround (for example, completely surround) each of the attaching tabs 76. In some embodiments, the attaching tabs 76 can each have a groove 82 to retain the wear bumper 80. In some embodiments, the wear bumper 80 can fill at least a portion of any open space between the attaching tab 76 and the opening 78. In some embodiments, the lower portion 54 can be coupled to the bracket 16 with each of the openings 78 surrounding at least a portion of each of the attaching tabs 76 and each of the wear bumpers 80.

In some embodiments, the openings 78 can also form a bayonet locking mechanism so that the lower portion 54 can be rotated to a locked position when each of the attaching tabs 76 locks into each of the bayonet locks formed at the opening 78. A user can also look through the openings 78 and visually verify that the attaching tabs 76 are in the locked position. In some embodiments, a bayonet locking mechanism can be formed or otherwise positioned in the bracket 16 without the openings 78.

Figure 12:
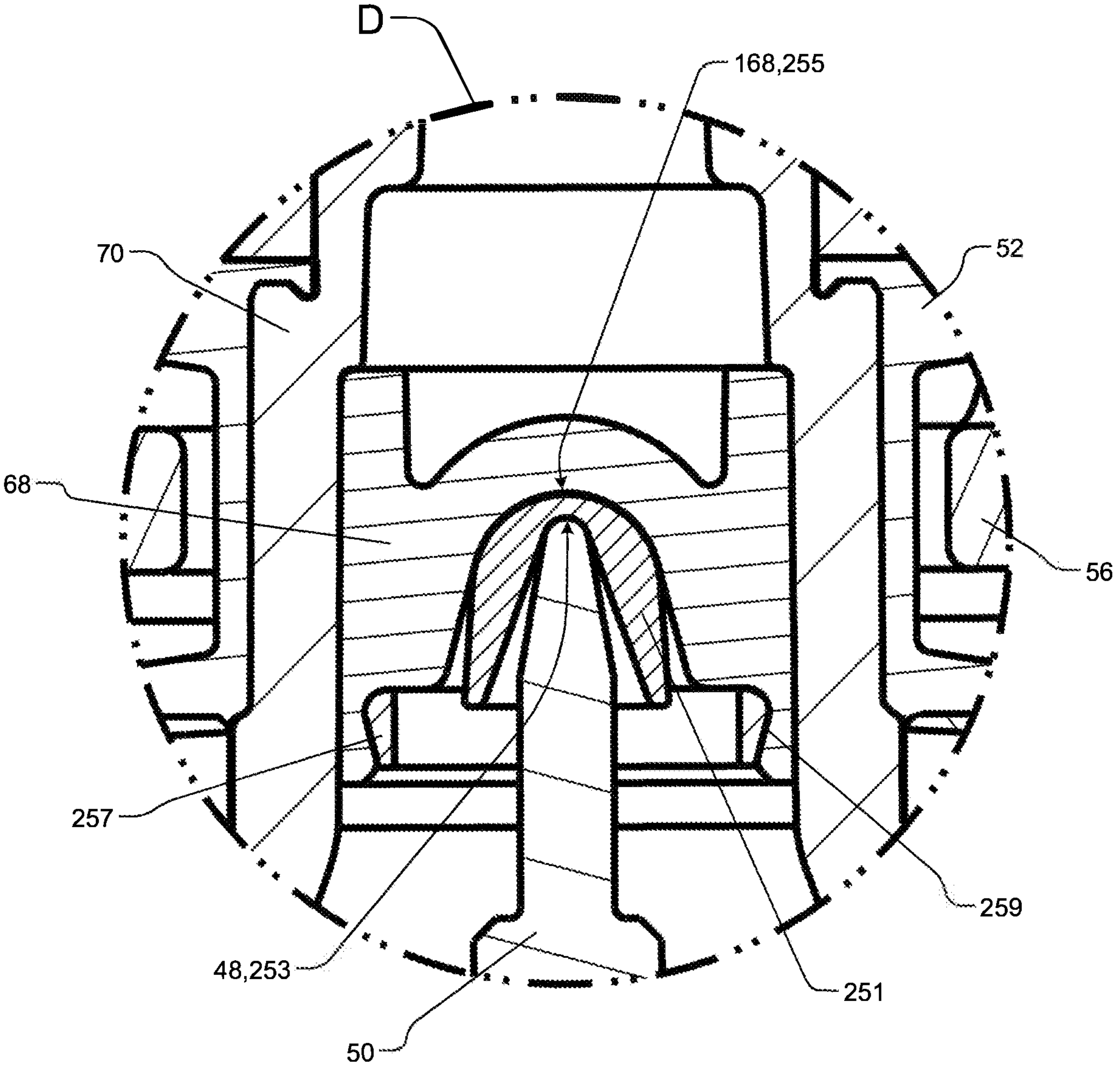
FIG. 12 is an enlarged view of FIG. 10 showing the starter cap of the sprinkler.

FIG. 12 is an enlarged portion of FIG. 10 enclosed by circular dashed line D. As shown here, the starter cap 251 is disposed between the bearing surface 48 of the shaft 50 and the lower bearing surface 168 of the bearing insert 68. The starter cap 251 may comprise a bullet-like shape, a cup-like shape, a thimble-like shape, or other shape with an inner bearing surface 253 and an outer bearing surface 255. The inner bearing surface 253 defines an interior portion or cavity within the starter cap 251. For example, the inner bearing surface 253 may define a cone-shaped cavity within the starter cap 251 having a circular opening at a lower end and partial spherical point at an upper end.

The outer bearing surface 255 defines an exterior portion of the starter cap 251. For example, the outer bearing surface 255 may define a partial spherical surface at the upper end that transitions to a side skirt at the lower end which meets the inner bearing surface 253.

The inner bearing surface 253 engages the bearing surface 48 of the shaft 50 and the outer bearing surface 255 engages the lower bearing surface 168 of the bearing insert 68, thus creating two areas of engagement and two articulation points on which the deflector assembly 38 may rotate, tilt, and nutate. In one aspect, a retainer 257 may capture the starter cap 251 within an interior portion of the bearing insert 68 defined by the lower bearing surface 168. The retainer 257 may include a snap-fit ring or clip. The retainer 257 may be configured to flex while being inserted into a circumferential groove 259 within the interior portion of the bearing insert 68.

Figure 13:
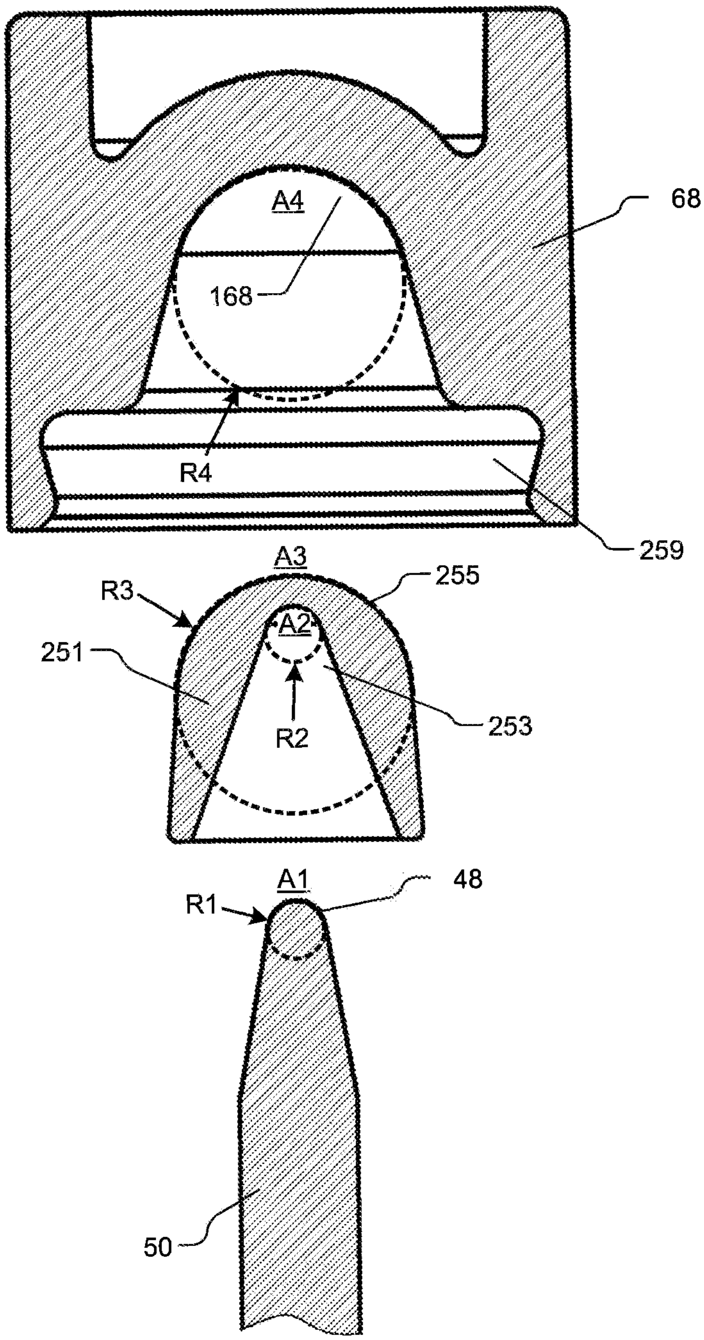
FIG. 13 is a cross-sectional exploded view of exemplary structures from FIG. 12 including the starter cap.

FIG. 13 is an exploded cross-sectional view of an upper end of the shaft 50, the starter cap 251, and the bearing insert 68 illustrating contact surfaces 168, 48, 253, 255. In one aspect, the bearing surface 48 comprises an outer surface on the upper end of the shaft 50. The bearing surface 48 may include a generally conical shape having at an upper tip a radiused surface with a first radius R1. In certain embodiments, the tip of the bearing surface 48 may include a portion of a sphere. In certain embodiments, the tip of the bearing surface 48 may include a point. In certain embodiments, the bearing surface 48 includes a first surface area A1.

In other aspects, the inner bearing surface 253 comprises an inner surface of the interior portion of the starter cap 251. In certain embodiments, the inner bearing surface 253 can include a generally conical-shaped cavity configured to receive and engage the bearing surface 48 of the shaft 50. In certain embodiments, the inner bearing surface 253 can include an upper end having a radiused surface with a second radius R2. In certain embodiments, the upper end of the inner bearing surface 253 can include a portion of a sphere. In certain embodiments, the upper end of the inner bearing surface 253 can include a point. In certain embodiments, the inner bearing surface 253 includes a second surface area A2 which contacts the first surface area A1 of the shaft 50. In certain embodiments, the second radius R2 may be the same as the first radius R1. In certain embodiments, the second radius R2 may be greater than the first radius R1. In certain embodiments, the second surface area A2 may be the same as the first surface area A1. In certain embodiments, the second surface area A2 may be greater than the first surface area A1.

In another aspect, the outer bearing surface 255 comprises an outer surface of the starter cap 251. In certain embodiments, the outer bearing surface 253 may include a generally conical shape having at an upper tip a radiused surface with a third radius R3. In certain embodiments, the upper tip of the outer bearing surface 255 may include a portion of a sphere. In certain embodiments, the upper tip of the outer bearing surface 255 can include a third surface area A3. In certain embodiments, the third radius R3 can be greater than the second radius R2. In certain embodiments, the third surface area A3 can be greater than the second surface area A2.

In other aspects, the lower bearing surface 168 comprises an inner surface of the interior portion of the bearing insert 68. In certain embodiments, the lower bearing surface 168 may include a generally conical-shaped cavity configured to receive and engage the outer bearing surface 255 of the starter cap 251. In certain embodiments, the lower bearing surface 168 may include an upper end having a radiused surface with a fourth radius R4. In certain embodiments, the upper end of the lower bearing surface 168 may include a portion of a sphere. In certain embodiments, the lower bearing surface 168 includes a fourth surface area A4 which contacts the third surface area A3 of the starter cap 251. In certain embodiments, the fourth radius R4 may be the same as the third radius R3. In certain embodiments, the fourth radius R4 may be greater than the third radius R3. In certain embodiments, the fourth surface area A4 may be the same as the third surface area A3. In certain embodiments, the fourth surface area A4 may be greater than the third surface area A3.

In some embodiments, the bearing insert 68 is press-fit into the receptacle 60. In some embodiments, the bearing insert 68 can also be removably attached in the receptacle 60 by using bayonet mounts, snap rings, keys, collars, or other attachment methods (e.g., attachment structures or methods that do not require use of tools or specialized tools for disconnection). In some embodiments, the lower bearing surface 168 of the bearing insert 68 engages the outer bearing surface 255 due to a shape complementary to the shape of the outer bearing surface bearing 255 such that when the sprinkler 10 is in the rest position the two surfaces are substantially engaged.

In some embodiments, the bearing surface 48 on the distal end of the shaft 50 includes a cone shape or other preferred convex surface. In some embodiments, the bearing surface 48 includes conical shape with an apex or point at the distal end. The apex may include a second radius R2 less than the first radius R1. In some embodiments, the inner bearing surface 255 is sized to fit over the bearing surface 48 of the shaft 50. For example, the inner bearing surface 255 may include a radius that is less than the first radius R1 and substantially the same as the second radius R2.

When there is no water flow, the deflector assembly 38 rests on the starter cap 251 and the starter cap 251 rests on the bearing surface 48 of the shaft 50. As water impinges on the distribution plate 12, the deflector assembly 38 is pushed into a rotary motion due to the grooves 42 in the distribution plate 12. The starter cap 251 moves freely on the shaft 50 because the friction force is reduced by the decreased contact between surface area A2 and surface area A1. As the deflector assembly 38 rotation accelerates, the increased rotational force overcomes any remaining friction force between surface area A4 and surface area A3.

As the deflector assembly 38 rotation accelerates even more, the bearing insert 68 lifts off from the starter cap 251 due to the increased angle of tilt such that surface area A3 is no longer in contact with surface area A4, thus eliminating forceful contact during operation. This double-articulation at the interfaces of the bearing insert 68 and starter cap 251 and the starter cap 251 and the bearing surface 48 of the shaft 50 reduces frictional contact between the deflector assembly 38 and the shaft 50, especially during initial startup or after prolong periods of non-use and no water flow, thus allowing the sprinkler 10 to begin rotating, tilting, and nutating at low pressure and low flow. Further benefit is gained by eliminating forceful contact of the bearing insert 68, the starter cap 251, and the shaft 50 during operation, thus reducing wear and prolonging the life of the sprinkler 10.

In some embodiments, every component of the sprinkler 10 can be serviced, cleaned, and/or replaced by a user with minimal tools and effort (such as without any tools, or with off-the-shelf tools like a standard-sized screwdriver and/or a standard sized wrench). The user can disassemble the sprinkler components in any order.

The user can also reassemble a cleaned or new starter cap 251 and/or bearing insert 68 into the receptacle 60 in the spindle 58. The user can reinsert the weight 72 (together or separately from the lower portion 54) so that the cleaned or new shaft 50 enters the receptacle 60 in the spindle 58 and positions the bearing surface 48 portion of the shaft 50 in contact with the starter cap 251. The user can also re-engage the attaching tabs 76 (which can include mounting the wear bumper 80 onto the attaching tabs 76) and the openings 78 to attach the lower portion 54 to the bracket 16. The user can reassemble the components in any order.

Terminology

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations, one or more features from a claimed combination can, in some cases, be excised from the combination, and the combination may be claimed as a sub combination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may" "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extends beyond the specifically disclosed embodiments to other alternative embodiments and/or uses of the embodiments and certain modifications and equivalents thereof. For example, some embodiments are configured to operate oriented such that the distribution plate is positioned above the nozzle and the nozzle directs water upward. Accordingly, it is intended that the scope of the sprinkler herein disclosed should not be limited by the particular disclosed embodiments described above but should be determined only by a fair reading of the claims that follow.

What is claimed is:

1. A sprinkler assembly comprising:
- an inlet configured to receive water;
- a bracket supported by the inlet;
- a nozzle in fluid communication with the inlet and positioned downstream of the inlet, the nozzle being configured to direct the water out of the nozzle along an axis;
- a shaft positioned downstream of the nozzle and supported by the bracket;
- a bearing surface on a distal end of the shaft;
- a deflector assembly configured to move with respect to the axis in one or both of a rotational and a tilting direction, the deflector assembly comprising:
- a distribution plate positioned downstream of the nozzle and configured to deflect water from the nozzle,
- a spindle extending from a side of the distribution plate facing away from the nozzle,
- a starter cap disposed between the bearing surface of the shaft and the spindle, and
- a bearing insert supported by the spindle, the bearing insert comprising a lower bearing surface,
- wherein the starter cap is sized and shaped to independently articulate with respect to both the shaft and the spindle at least during a startup of the sprinkler assembly, and wherein the starter cap comprises an outer bearing surface contacting the lower bearing surface at least during the startup.

2. The sprinkler assembly of claim 1, wherein the starter cap has a convex outer surface.

3. The sprinkler assembly of claim 1, wherein the starter cap has a partial spherical surface.

4. The sprinkler assembly of claim 1, wherein the starter cap has a concave inner surface.

5. The sprinkler assembly of claim 1, wherein the starter cap comprises an inner bearing surface, the inner bearing surface contacting the bearing surface at least during the startup.

6. The sprinkler assembly of claim 1, further comprising a retainer configured to capture the starter cap in an interior of the bearing insert.

7. The sprinkler assembly of claim 6, wherein the interior of the bearing insert comprises a groove sized and shaped to capture the retainer.

8. The sprinkler assembly of claim 1, further comprising a weight supported by the spindle.

9. The sprinkler assembly of claim 1, wherein a receptacle in the spindle comprises the bearing insert.

10. The sprinkler assembly of claim 9, wherein the bearing surface is at least partially disposed in the receptacle.

11. A sprinkler assembly comprising:
- an inlet;
- a bracket connected to the inlet;
- a nozzle in fluid communication with the inlet and positioned downstream of the inlet, the nozzle configured to direct water out of the nozzle along a nozzle axis;
- a deflector assembly downstream of the nozzle and configured to move with respect to the nozzle axis in one or both of a rotational and a tilting direction about a pivot point, the deflector assembly comprising:
  - a distribution plate configured to deflect water from the nozzle,
  - a spindle extending from a side of the distribution plate facing away from the nozzle and terminating at a distal end, the distal end comprising a receptacle,
  - a bearing insert disposed in the receptacle, and
  - a starter cap disposed in the bearing insert;
- a shaft positioned downstream of the nozzle and supported by the bracket; and
- a bearing surface on a distal end of the shaft and contacting the starter cap at least during a startup of the sprinkler assembly,
- wherein the starter cap is sized and shaped to independently articulate with respect to both the shaft and the spindle at least during the startup of the sprinkler assembly.

12. The sprinkler assembly of claim 11, wherein the starter cap comprises an inner bearing surface, the inner bearing surface contacting the bearing surface at least during the startup.

13. The sprinkler assembly of claim 12, wherein the starter cap comprises an outer bearing surface, and wherein the bearing insert comprises a lower bearing surface, the outer bearing surface contacting the lower bearing surface at least during the startup.

14. The sprinkler assembly of claim 13, wherein the inner bearing surface has a first radius and the outer bearing surface has a second radius greater than the first radius.

* * * * *